United States Patent
Janssens et al.

(10) Patent No.: US 10,511,946 B2
(45) Date of Patent: Dec. 17, 2019

(54) DYNAMIC SECURE MESSAGING

(71) Applicant: NXP B.V., Eindhoven (NL)

(72) Inventors: Pieter Janssens, Deurne (BE); Abu Ismail, Rellingen (DE); Christian Schwar, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/844,525

(22) Filed: Dec. 16, 2017

(65) Prior Publication Data

US 2018/0176716 A1   Jun. 21, 2018

(30) Foreign Application Priority Data

Dec. 16, 2016   (EP) .................................. 16204846

(51) Int. Cl.
| | |
|---|---|
| *H04W 4/80* | (2018.01) |
| *G06F 21/60* | (2013.01) |
| *H04W 12/02* | (2009.01) |
| *H04W 12/12* | (2009.01) |
| *H04L 29/06* | (2006.01) |
| *H04B 5/00* | (2006.01) |
| *H04L 9/08* | (2006.01) |
| *H04L 9/30* | (2006.01) |

(52) U.S. Cl.
CPC ............ *H04W 4/80* (2018.02); *G06F 21/602* (2013.01); *H04B 5/0031* (2013.01); *H04L 9/0866* (2013.01); *H04L 9/30* (2013.01); *H04L 63/0435* (2013.01); *H04W 12/02* (2013.01); *H04W 12/12* (2013.01)

(58) Field of Classification Search
CPC ........ H04B 5/0031; H04L 9/0866; H04L 9/30
USPC ........................................................ 455/411
See application file for complete search history.

(56) References Cited

U.S. PATENT DOCUMENTS

| | | | |
|---|---|---|---|
| 8,706,036 B2 | 4/2014 | Bukovjan et al. | |
| 8,750,514 B2 | 6/2014 | Gallo et al. | |
| 2015/0248668 A1 | 9/2015 | Radu et al. | |
| 2015/0371453 A1* | 12/2015 | Gallo | G06F 21/35 |
| | | | 340/5.65 |
| 2018/0160255 A1* | 6/2018 | Park | H04L 67/02 |

FOREIGN PATENT DOCUMENTS

EP    2 960 842 A1    12/2015

OTHER PUBLICATIONS

Extended European Search Report for Patent Appln. No. 16204846.6 (dated Mar. 8, 2017).

* cited by examiner

*Primary Examiner* — Shahriar Behnamian

(57) ABSTRACT

The disclosure relates to dynamic secure messaging using near-field communication. Example embodiments include a near field communication target device (102) configured to respond to a read request (202) transmitted by a reader device (101) by transmitting a message (204) comprising an unencrypted portion and an encrypted portion, the encrypted portion incorporating a counter that is incremented each time a read request is received.

15 Claims, 2 Drawing Sheets

DYNAMIC SECURE MESSAGING

CROSS-REFERENCE TO RELATED APPLICATIONS

This application claims the priority under 35 U.S.C. § 119 of European patent application no. 16204846.6, filed on Dec. 16, 2016, the contents of which are incorporated by reference herein.

FIELD

The disclosure relates to dynamic secure messaging using near-field communication.

BACKGROUND

Near-field communication (NFC) allows electronic devices to communicate over short distances (typically a few cm), enabling applications such as contactless payment and identification, as well as for other more general applications involving sharing of data between devices. NFC uses electromagnetic induction, requiring a pair of loop antennas typically operating over the RF ISM band around 13.56 MHz and in accordance with the ISO/IEC 18000-3 standard.

Communication using NFC is generally initiated by a reader device, which transmits a carrier field, prompting any target device within range to respond. Typically a target device, which may for example be a smart card, will draw the electrical power required to respond from the carrier field. The target and reader devices can then communicate with each other, for as long as the devices are within range.

Standard reader applications, for example NFC Forum Type 4 Tag readers implemented on smartphones, do not implement any security as they are not aware of any application specific keys and do not implement any authentication and/or secure messaging protocol. They therefore have limited use in assessing the authenticity of a tag read operation. The data could be encoded with a static system level encryption and/or a message authentication code (MAC) or signature upon personalization of the tag. This type of encryption may allow confidentiality, but could still create a unique tracker allowing traceability, raising privacy concerns. The use of a MAC or signature allows integrity and authenticity checking but, because it is static, it can easily be read out by an attacker and played at another time or repeated multiple times to a reader that may not be able to distinguish between a valid tag and a signal generated by an attacker.

One application of NFC technology is in enabling a reader device, which may for example be provided on a mobile device such as a mobile telephone (i.e. a smart phone), to access information stored on a target device. An example of this type is disclosed in U.S. Pat. No. 8,750,514, where a smart poster comprising an NFC device communicates with a mobile device. The NFC device provides a uniform resource identifier (URI) to the mobile device, which then communicates with a server identified by the URI to access further content. Information transmitted by the NFC device to the mobile device includes a counter value, which enables the server to determine how many executed read access have been performed, and enables the NFC device and the server to be authenticated. This does not, however, necessarily overcome the privacy concerns, since an attacker can read the counter as well as other data that may be confidential or can be related to the tag owner.

A further problem with generic reader applications, such as those according to the NFC Forum Type 4 Tag Operation Specification, is that the reader may not be able to authenticate the data read because it does not possess application specific keys.

SUMMARY

In accordance with a first aspect there is provided a near field communication target device configured to respond to a read request transmitted by a reader device by transmitting a message comprising an unencrypted portion and an encrypted portion, the encrypted portion incorporating a counter that is incremented each time a read request is received.

The counter is incorporated in the encrypted portion such that the counter can be recovered or verified on decryption of the encrypted portion.

The target device is configured such that data read by the reader device (e.g. the NDEF file in case of an NFC Forum Type 4 Tag) is complemented with security by dynamic encryption, i.e. using encryption that will result in a different output for each read request. This will protect confidentiality of the transmitted data and will also prevent any eavesdropping device from determining whether a transmission has come from any particular device, thereby addressing concerns regarding privacy. In examples where a URI is included in the unencrypted portion, the reader device can access further information on a server identified by the URI, which is able to authenticate the target device by decrypting the encrypted portion of the message. In other examples, the reader device may either hold a decryption key or may already know the address of a server where decryption can be performed.

The encrypted portion may incorporate an identification code for the target device, which may for example be a unique identification (UID) code of the target device, i.e. a UID code according to ISO14443. The identification code may alternatively be a code that identifies a user of the target device, and may therefore not be unique to that device.

The unencrypted portion of the message may contain a uniform resource identifier (UID) of a resource for decryption of the encrypted portion of the message. The encrypted portion may comprise the counter, or alternatively the encrypted portion may be encrypted with a session key derived from the counter. In some embodiments the unencrypted portion does not contain the counter.

Incorporating a counter, and optionally the target device UID, in the encrypted portion may avert privacy concerns, because on each read request a different message is output, thereby preventing tracking, and also limit message replay concerns. The encrypted data can be complemented with an authentication code, for example a dynamically generated signature or a message authentication code (MAC). Authenticity can then be verified by the backend server receiving the information. The backend server may for example be a web service in the case of the URI being encoded using the NFC Data Exchange Format (NDEF). Decryption can also only be done by the server. This allows certain security properties without requiring predefined mutual authentication, as is required for applications such as MIFARE tags, and without requiring knowledge of the keys by the reader device. Standard existing tag specifications such as NFC Forum Type 4 Tag can therefore be used.

The proposed solution described herein allows for security to be added to applications using generic tag readers, where the tag reader itself does not need to implement any authentication and/or secure messaging protocols, like the above mentioned NFC Forum Type 4 Tag readers. This is done by having the tag dynamically encrypting part or all of the data read. Which particular part of the data is encrypted can be configured during tag personalization. This allows exclusion of for example the targeted web server from encryption in case of an NDEF URI message.

Including the counter in the encrypted portion of the message, and not the unencrypted portion, limits the attack window for an attacker that wishes to read out valid messages from a valid tag and replay them at a time of his own choosing, i.e. when not having access to the authentic tag. This is done by keeping track in the backend server of the highest counter value seen for a specific tag, and not allowing replay of that or lower values. A further security check to ensure that a valid tag is being read would be to require more than one read request to be made by the reader device, which will cause the target device to increment the counter for the second read request. If the target device is valid, the encrypted portion will change for the second read request, and the server will decrypt the two successive messages to find two successive counter values. If the target device is not valid, the encrypted portion will not change, or decryption will fail. This can protect against attackers capable of repeating only static content. If an attacker is capable of storing multiple replies read out from a valid tag and repeating them in the correct sequential order, the server may be unable to detect whether the replies are valid. There is however a limited attack window as the server would be able to detect that a bigger counter than the one in the sequential messages has already been used if the valid tag was used in the meantime, and may be able to refuse authentication on this basis.

Including the counter in the encrypted portion averts tracking threats as the generated cryptograms will be different on each generation. In some embodiments the target device UID can also be included in the encrypted portion to ensure different cryptograms across the tag population. If necessary, the UID and/or counter might still be communicated encrypted as part of the read out message applying a different (less sensitive, e.g. non-UID-diversified) key.

Implementations may be based on symmetric cryptography, i.e. where the same key is used for decryption as for encryption, or may be based on asymmetric cryptography, where the encryption key used by the target device is different to the decryption key used by the server.

In accordance with a second aspect there is provided a method of near field communication between a target device and a reader device, the method comprising:

i) the reader device transmitting a read request;

ii) the target device responding to the read request by transmitting a message comprising an unencrypted portion and an encrypted portion, the unencrypted portion of the message incorporating a counter that is incremented each time a read request is received.

The encrypted portion may incorporate an identification code for the target device. The identification code may be a unique identification code of the target device.

The unencrypted portion of the message may contain a uniform resource identifier of a resource for decryption of the encrypted portion of the message.

The encrypted portion may comprise the counter, or alternatively may be encrypted with a session key derived from the counter.

The method may further comprise:

the reader device transmitting the encrypted portion of the message to the resource identified by the uniform resource identifier; and the resource decrypting the encrypted portion of the message and sending a verification message to the reader device.

The method may further comprise:

the target device incrementing the counter after transmitting the message, the encrypted portion being a first encrypted portion; and repeating steps i) and ii), wherein the encrypted portion is a second encrypted portion.

The method may further comprise:

the reader device transmitting the first and second encrypted portions to the resource identified by the uniform resource identifier; and the resource decrypting the first and second encrypted portions of the message and sending a verification message to the reader device.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
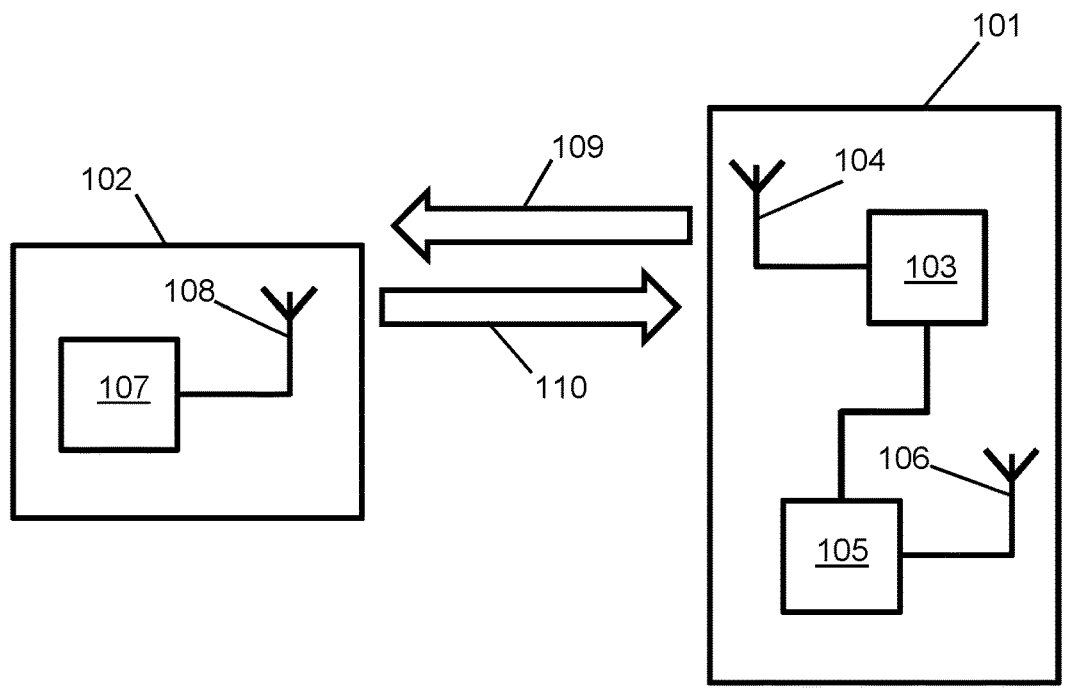
FIG. 1 is a schematic diagram illustrating an example reader device communicating with an example target device.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates schematically a reader device 101 in communication with a target device 102 using near field communication. The reader device 101, which may for example be a smart phone, comprises an NFC reader module 103 and associated NFC antenna 104. The reader device 101 also comprises a further wireless communication module 105 with associated antenna 106. The wireless communication module 105 may for example be a cellular wireless communication module or may be a module configured for communication via a wireless local area network, and both types of module may be present in a typical reader device 101.

The target device 102 comprises a near field communication module 107 and an associated antenna 108. The target device 102 may for example be in the form of a tag attached to or embedded in an article, or a smart card.

In operation, the reader device 101 transmits a read request signal 109 via antenna 104. The read request may be transmitted in response to a user interaction with the reader device, for example by the user initiating the read request by activating a control when the reader device is within range of the target device, or in some cases by tapping the reader device 101 on the target device 102 or by waving the reader device 101 in proximity to the target device 102. The target device responds to the read request signal 109 by transmitting a message in a return signal 110, which is received by antenna 104 on the reader device and processed by the reader module 103. The message comprises an unencrypted portion and an encrypted portion, the unencrypted portion including a uniform resource identifier (URI) for a resource, or server, that is able to decrypt the encrypted portion. The reader device does not therefore need to be able to decrypt any portion of the message but instead can pass on the encrypted portion to the server identified by the URI. Once the decrypted portion of the message has been received from the server by the reader device, and the target device authenticated, the reader device can establish a secure communication link with the server.

Figure 2:
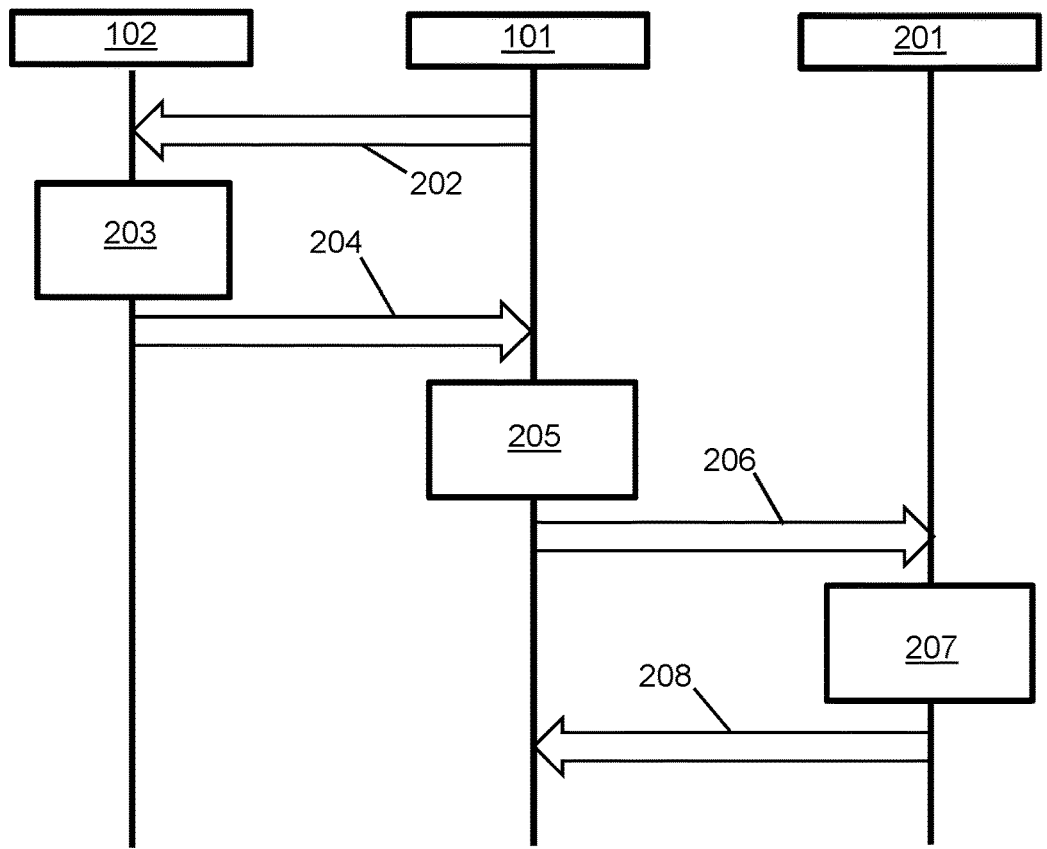
FIG. 2 is a schematic diagram illustrating an example sequence of message exchanges between a reader device, a target device and a server.

The basic process described above is illustrated in the diagram in FIG. 2, in which the three vertical lines represent actions taken in sequence by the target device 102, the reader device 101 and the server 201 (not shown in FIG. 1). This illustrates an example of a case of a single use login enabled by the target device 102 by reference to a server 201. The reader device 101 initiates the process by sending a read request 202. This read request 202 is then processed 203 by the target device 102, which then transmits a message 204. The message 204 is read and processed 205 by the reader device 101, which parses the unencrypted portion to obtain the URI for accessing the server. The reader device 101 then sends a message 206 to the server 201 identified by the URI. Upon receiving the message 206, the server 201 decrypts 207 the encrypted portion of the message 206 and returns a validation message 208 to the reader device. Provided the decryption is successful and the target device 102 is authenticated, the reader device 101 and the server 201 can then establish a secure communication link.

Figure 3:
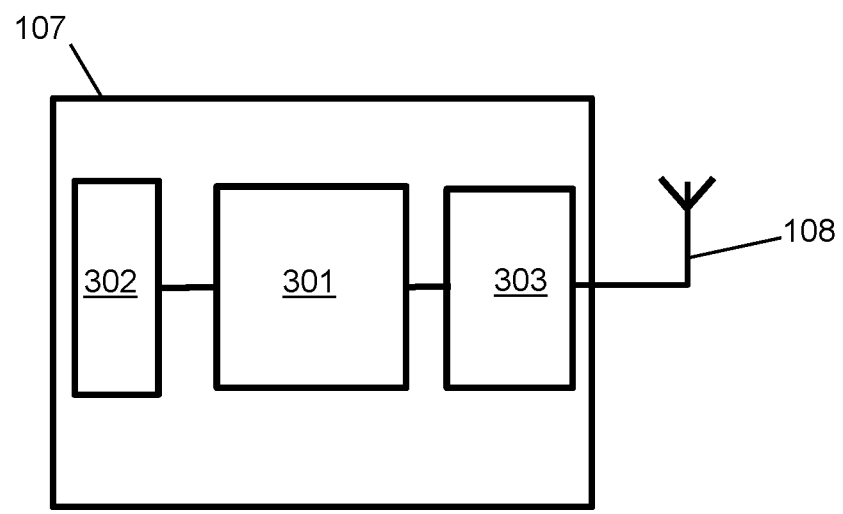
FIG. 3 is a schematic diagram of an example NFC communication module of a target device.

The NFC communication module 107 of the target device 102 comprises a processor 301, a non-volatile memory (NVM) 302 and a communication module 303, as illustrated in FIG. 3. The NVM 302 stores information relating to the module 107, such as a UID and a counter. The counter may be incremented each time a read request is received by the module 107. The processor 301 receives signals from, and sends signals to, the communication module 303, which receives and send signals from and to the antenna 108. The communications module also provides power to the processor 301 derived from signals received via the antenna 108.

A first read command from the reader device 101 may cause the processor 301 to increment the counter in the NVM 302. Subsequent read commands from the same reader device may result in the counter not being incremented, and the counter may be incremented once any other command has been received, causing the counter to be incremented on a subsequent read command. Alternatively, the counter may be incremented more than once for the same reader device, for example in the case where additional security is required to show that messages from the target device are not being replicated by an attacker. Since the content of the encrypted portion is not known to the attacker, and will change each time the counter is incremented, sending a second message after incrementing the counter will reduce the possibility of an attacker being able to reproducing the messages.

As part of the process of responding to a read request, a session key is generated. This session key may be derived from a non-diversified key (i.e. the same for every target device of that type) or a diversified key (i.e. different for each target device). Both types of keys may be generated. The session key incorporates the current counter value, and optionally also the UID of the target device. One key may be generated for encryption, while another may be generated for creating a MAC.

In alternative implementations, the reader device 101 may collect responses from the target device 102, for example for later decryption and verification. The reader device 101 may already be in possession of a URI for contacting a server for decryption and verification or may be able to perform these functions itself, in which case there is no need for a URI to be included in the responses.

From reading the present disclosure, other variations and modifications will be apparent to the skilled person. Such variations and modifications may involve equivalent and other features which are already known in the art of near field communication, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of near field communication between a target device and a reader device, the method comprising:
    the reader device transmitting a read request for data;
    the target device responding to the read request by transmitting a message comprising an unencrypted portion and an encrypted portion, wherein
        the encrypted portion comprises a current value of a counter that is incremented each time a read request is received,
        the encrypted portion is encrypted by the target device using an encryption key,
        the encryption key is a session key generated based on the current value of the counter, and
        the reader device does not know the encryption key;
    the reader device receiving the message and transmitting the encrypted portion to a server;
    the server decrypting the encrypted portion and recovering the current value of the counter;
    the server comparing the current value of the counter with a previous value of the counter, wherein the previous value of the counter is associated with a previous read request received by the target device; and
    in response to the current value being greater than the previous value by an expected amount, the server transmitting a validation message to the reader device.

2. The method of claim 1, wherein the encrypted portion further comprises an identification code of the target device.

3. The method of claim 2 wherein the identification code is a unique identification code of the target device.

4. The method of claim 1, wherein the unencrypted portion of the message comprises a uniform resource identifier of the server for decryption of the encrypted portion of the message.

5. The method of claim 1, wherein a uniform resource identifier of the server for decryption of the encrypted portion of the message is stored on the reader device.

6. The method of claim 1, wherein the reader device transmitted the previous read request for the data prior to the read request, wherein the read request and the previous read request are associated with the data, and the target device transmitted a previous message in response to the previous read request, the previous message comprising a previous encrypted portion, the previous encrypted portion comprising the previous value of the counter.

7. The method of claim 6, wherein the reader device transmitted the previous encrypted portion to the server, and the server decrypted the previous encrypted portion and recovered the previous value of the counter.

8. The method of claim 1, further comprising:

in response to receiving the validation message, the reader device establishing a secure communication link with the server.

9. The method of claim 1, further comprising:

in response to the current value not being greater than the previous value by the expected amount, the server transmitting an authentication fail message to the reader device indicating that the target device is not valid.

10. The method of claim 1, wherein the encryption key is further generated based on a unique identification code of the target device.

11. The method of claim 1, wherein the encryption key used by the target device is derived from a diversified key.

12. The method of claim 1, wherein the encryption key used by the target device is derived from a non-diversified key.

13. The method of claim 1, wherein the encrypted portion is decrypted by the server using the encryption key.

14. The method of claim 1, wherein the encrypted portion is decrypted by the server using a decryption key different from the encryption key, and the reader device does not know the decryption key.

15. The method of claim 10, wherein a second session key is generated as a message authentication code (MAC) key, and the message further comprises a MAC created based on the MAC key and at least the encrypted portion of the message.

* * * * *